US012811742B2

(12) United States Patent
Karjalainen et al.

(10) Patent No.: US 12,811,742 B2
(45) Date of Patent: Nov. 24, 2026

(54) METHOD AND DEVICES FOR IMPLICIT SWITCHING OF CORESETPOOLINDEX VALUES FOR M-DCI BASED SIMULTANEOUS MULTI-PANEL PUSCH TRANSMISSION

(71) Applicant: Nokia Technologies Oy, Espoo (FI)

(72) Inventors: Juha Pekka Karjalainen, Sotkamo (FI); Timo Koskela, Oulu (FI); Sami-Jukka Hakola, Kempele (FI)

(73) Assignee: Nokia Technologies Oy, Espoo (FI)

( * ) Notice: Subject to any disclaimer, the term of this patent is extended or adjusted under 35 U.S.C. 154(b) by 242 days.

(21) Appl. No.: 18/596,584

(22) Filed: Mar. 5, 2024

(65) Prior Publication Data

US 2024/0305427 A1 Sep. 12, 2024

Related U.S. Application Data

(60) Provisional application No. 63/488,957, filed on Mar. 7, 2023.

(51) Int. Cl.
*H04W 72/00* (2023.01)
*H04B 17/318* (2015.01)
(Continued)

(52) U.S. Cl.
CPC ......... *H04L 5/0051* (2013.01); *H04B 17/328* (2023.05); *H04W 72/1268* (2013.01); *H04W 72/232* (2023.01); *H04W 76/20* (2018.02)

(58) Field of Classification Search
CPC ... H04L 5/0051; H04L 5/0025; H04L 5/0053; H04L 5/0094; H04L 5/0048;
(Continued)

(56) References Cited

U.S. PATENT DOCUMENTS

2021/0243659 A1* 8/2021 Cirik ..................... H04L 5/0048
2023/0276454 A1* 8/2023 Zhu ....................... H04L 5/0051 370/329
(Continued)

FOREIGN PATENT DOCUMENTS

WO WO-2022052025 A1 * 3/2022 ........... H04L 5/0053

OTHER PUBLICATIONS

Fraunhofer et al. (On UL precoding indication for simultaneous multi-panel transmission, R1-2211591, Nov. 18, 2022).*
(Continued)

*Primary Examiner* — Lakeram Jangbahadur
(74) *Attorney, Agent, or Firm* — Lippes Mathias LLP

(57) ABSTRACT

A method performed by a user device, including performing the steps of: receiving, from a network entity, one or both of: at least one resource of at least one downlink reference signal, and an indication; triggering switching, from a first association to a second association between at least two CORESETPoolIndex values and at least two sounding reference signal resource sets, based on a determination of one or both of: a measured value of the at least one DL reference signal and the indication; and transmitting respectively, to the network entity, corresponding resources of one or more sounding reference signals that correspond to the second association after the switching.

14 Claims, 4 Drawing Sheets

(51) Int. Cl.

| | |
|---|---|
| ***H04L 5/00*** | (2006.01) |
| ***H04W 72/1268*** | (2023.01) |
| ***H04W 72/232*** | (2023.01) |
| ***H04W 76/20*** | (2018.01) |

(58) Field of Classification Search

CPC ............ H04B 17/328; H04W 72/1268; H04W 72/232; H04W 76/20

See application file for complete search history.

(56) References Cited

U.S. PATENT DOCUMENTS

| | | | | |
|---|---|---|---|---|
| 2023/0370219 | A1* | 11/2023 | Ling | H04L 5/0053 |
| 2023/0396375 | A1* | 12/2023 | Muruganathan | H04L 5/0091 |
| 2025/0184061 | A1* | 6/2025 | Khoshnevisan | H04L 5/0048 |
| 2025/0202558 | A1* | 6/2025 | Kwak | H04B 7/0626 |

OTHER PUBLICATIONS

"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.

"3rd Generation Partnership Project; Technical Specification Group Radio Access Network; NR; Physical layer procedures for data (Release 17)", 3GPP TS 38.214, V17.4.0, Dec. 2022, pp. 1-231.

"3rd Generation Partnership Project; Technical Specification Group Radio Access Network; NR; Multiplexing and channel coding (Release 17)", 3GPP TS 38.212, V17.4.0, Dec. 2022, pp. 1-202.

"3rd Generation Partnership Project; Technical Specification Group Radio Access Network; NR; User Equipment (UE) radio access capabilities (Release 17)", 3GPP TS 38.306, V17.3.0, Dec. 2022, pp. 1-253.

Extended European Search Report received for corresponding European Patent Application No. 24157534.9, dated Sep. 18, 2024, 12 pages.

"On UL precoding indication for simultaneous multi-panel transmission", 3GPP TSG RAN WG1 Meeting #111, R1-2211591, Agenda Item: 9.1.4.1, Fraunhofer IIS, Nov. 14-18, 2022, 5 pages.

* cited by examiner

METHOD AND DEVICES FOR IMPLICIT SWITCHING OF CORESETPOOLINDEX VALUES FOR M-DCI BASED SIMULTANEOUS MULTI-PANEL PUSCH TRANSMISSION

CROSS-REFERENCE TO RELATED APPLICATIONS/INCORPORATION BY REFERENCE

This application claims priority to, and the benefits of the U.S. Provisional Application No. 63/488,957, filed on Mar. 7, 2023, which is herein incorporated by reference in its entirety.

TECHNICAL FIELD

Some example embodiments may generally relate to uplink and downlink (UL/DL) multiple input multiple output (MIMO) enhancement method carried out by a terminal device, and a network entity. More specifically, certain embodiments of the invention introduce autonomous/implicit dynamic CORESETPoolIndex value switch for multi-downlink control information (M-DCI) based simultaneous multi-panel (STxMP) PUSCH transmission.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

UEs may be equipped with different number of TX antenna panels with different TX capabilities, e.g. number of TX antenna ports, max number of supported PUSCH layers, where one or more antenna panels may be used for full/partially/non-simultaneous multi-panel PUSCH transmissions to different TRPs associated with different CORESETPoolIndex values. To support different TX antenna panel capabilities, UE may be configured with two uplink sounding reference signal (UL SRS) resource sets where each set is configured with same or different number of resources with different number of antenna ports according to panel specific capabilities.

It has been agreed that, for M-DCI based STxMP PUSCH UE may be configured with one or more UL SRS resource sets with fixed association with TRPs (transmission reception points) via CORESETPoolIndex association. For M-DCI based STxMP PUSCH, UE may be configured with one or more UL SRS resource sets with fixed association with TRPs via CORESETPoolIndex association. However, fixed association between configured UL RS resource sets and CORESETPoolIndices leads to a problem that existing uplink DCI format may not be used to trigger M-DCI based STxMP PUSCH transmission to different TRPs. In other words, the fixed association may allow only higher layer reconfiguration of the association to support e.g. condition that the UE rotates and panels being directed to different TRPs than to ones they were directed at the time of the configuration of the association.

Further limitations and disadvantages of conventional and traditional approaches will become apparent to one of skill in the art, through comparison of such systems with some aspects of the present invention as set forth in the remainder of the present application with reference to the drawings.

SUMMARY

According to an exemplary embodiment, an apparatus may include: at least one processor; and at least one memory storing instructions that, when executed by the at least one processor, cause the apparatus at least to: (i) receive, from a network entity, one or both of: at least one resource of at least one downlink reference signal, and an indication; (ii) trigger switching, from a first association to a second association between at least two CORESETPoolIndex values and at least two sounding reference signal resource sets, based on a determination of one or both of: a measured value of the at least one downlink reference signal (DL RS) and the indication; and (iii) transmit respectively, to the network entity, corresponding resources of one or more sounding reference signals (SRS) that correspond to the second association after the switching.

According to an exemplary embodiment, an apparatus may include: means for receiving, from a network entity, one or both of: at least one resource of at least one downlink reference signal, and an indication; means for triggering switching, from a first association to a second association between at least two CORESETPoolIndex values and at least two sounding reference signal resource sets, based on a determination of one or both of: a measured value of the at least one DL reference signal and the indication; and means for transmitting respectively, to the network entity, corresponding resources of one or more sounding reference signals that correspond to the second association after the switching.

According to an exemplary embodiment, a method performed by an apparatus may include the steps of: receiving, from a network entity, one or both of: at least one resource of at least one downlink reference signal, and an indication; triggering switching, from a first association to a second association between at least two CORESETPoolIndex values and at least two sounding reference signal resource sets, based on a determination of one or both of: a measured value of the at least one DL reference signal and the indication; and transmitting respectively, to the network entity, corresponding resources of one or more sounding reference signals that correspond to the second association after the switching.

According to an exemplary embodiment, a non-transitory computer readable storage medium storing instruction that, when executed by at least one processor of an apparatus, causes the apparatus at least to perform: receiving, from a network entity, one or both of: at least one resource of at least one downlink reference signal, and an indication; triggering switching, from a first association to a second association between at least two CORESETPoolIndex values and at least two sounding reference signal resource sets, based on a determination of one or both of: a measured value of the at least one DL reference signal and the indication; and transmitting respectively, to the network entity, corresponding resources of one or more sounding reference signals that correspond to the second association after the switching.

According to an exemplary embodiment, a network entity, may include: at least one processor; and at least one memory storing instructions that, when executed by the at least one processor, cause the network entity at least to: (i) provide, to a user equipment, one or both of: at least one resource of at least one downlink reference signal, and an indication; and (ii) receive respectively, corresponding resources of one or more sounding reference signals transmitted from the user equipment, each of the one or more respective SRS resource sets corresponds to the at least one corresponding respective resource set association after switching from a first association to a second association between at least two CORESETPoolIndex values and at least two sounding reference signal resource sets, based on a determination of one or both of: a measured value of the at least one DL reference signal and the indication.

According to an exemplary embodiment is a network entity, may include: means for providing to a user equipment, one or both of: at least one resource of at least one downlink reference signal, and an indication; and means for receiving respectively, corresponding resources of one or more sounding reference signals transmitted from the user equipment, each of the one or more respective SRS resource sets corresponds to the at least one corresponding respective resource set association after switching from a first association to a second association between at least two CORESETPoolIndex values and at least two sounding reference signal resource sets, based on a determination of one or both of: a measured value of the at least one DL reference signal and the indication.

According to an exemplary embodiment is a method performed by a network entity, including the steps of: providing to a user equipment, one or both of: at least one resource of at least one downlink reference signal, and an indication; and receiving respectively, corresponding resources of one or more sounding reference signals transmitted from the user equipment, each of the one or more respective SRS resource sets corresponds to the at least one corresponding respective resource set association after switching from a first association to a second association between at least two CORESETPoolIndex values and at least two sounding reference signal resource sets, based on a determination of one or both of: a measured value of the at least one DL reference signal and the indication.

According to an exemplary embodiment is a non-transitory computer readable storage medium storing instruction that, when executed by at least one processor of a network entity, causes the network entity at least to perform: providing to a user equipment, one or both of: at least one resource of at least one downlink reference signal, and an indication; and receiving respectively, corresponding resources of one or more sounding reference signals transmitted from the user equipment, each of the one or more respective SRS resource sets corresponds to the at least one corresponding respective resource set association after switching from a first association to a second association between at least two CORESETPoolIndex values and at least two sounding reference signal resource sets, based on a determination of one or both of: a measured value of the at least one DL reference signal and the indication.

According to an exemplary embodiment is a method performed by an apparatus or a network entity, substantially as shown and described with respect to at least one of FIGS. 1-3, for determining switching of CORESETPoolIndex values for M-DCI based Simultaneous Multi-Panel PUSCH Transmission.

Certain exemplary embodiments may provide a non-transitory computer readable storage medium storing instruction that, when executed by at least one processor of an apparatus or a network entity, may cause the apparatus at least to perform one or more of the methods substantially as shown and described with respect to at least one of FIGS. 1-3, for determining switching of CORESETPoolIndex values for M-DCI based Simultaneous Multi-Panel PUSCH Transmission.

According to an exemplary embodiment, an apparatus may include: at least one processor; and at least one memory storing instructions that, when executed by the at least one processor, cause the apparatus at least to: (i) receive, from a network entity, one or both of: at least one resource of at least one downlink reference signal, and an indication; (ii) receive, from a network entity, a command to switch from a first association to a second association between at least two CORESETPoolIndex values and at least two sounding reference signal resource sets; a and (iii) transmit respectively, to the network entity, corresponding resources of one or more sounding reference signals (SRS) that correspond to the second association after the switching.

BRIEF DESCRIPTION OF THE DRAWINGS

For proper understanding of example embodiments, reference should be made to the accompanying drawings, as follows.

DETAILED DESCRIPTION

It will be readily understood that the components of certain example embodiments, as generally described and illustrated in the figures herein, may be arranged and designed in a wide variety of different configurations. The same reference designation may be used in multiple figures to refer to the same element or function. The following is a detailed description of some exemplary embodiments of systems, methods, apparatuses, and non-transitory computer program products for implicit switching of CORESETPoolIndex values for M-DCI based Simultaneous Multi-Panel PUSCH Transmission.

Figure 1:
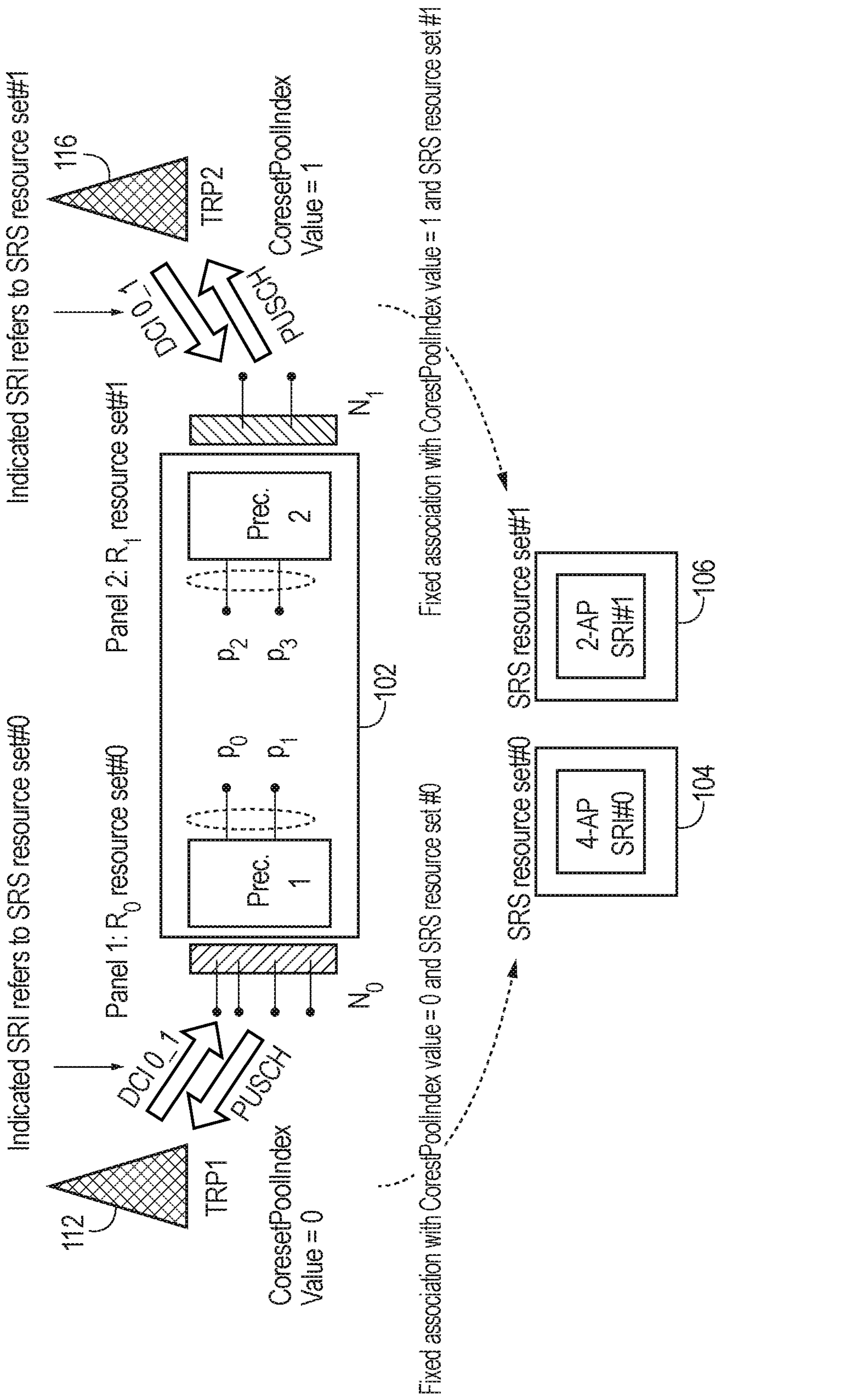
FIG. 1 illustrates an example of use of fixed CORESETPoolIndex value association with uplink sounding reference resource (UL SRS) sets.

FIG. 1 illustrates an example of use of fixed CORESETPoolIndex value association with uplink sounding reference resource (UL SRS) set. FIG. 1 shows an example of agreed fixed association between CORESETPoolIndexvalues and UL SRS resource sets. When M-DCI based STxMP PUSCH transmission is triggered from a first transmission reception point (TRP #1) 112 (where CORESET associated with triggering DCI having CORESETPoolIndexvalue=0), a user equipment (UE) 102 may assume that the SRI codepoint field value indicates SRI (i.e. SRI #0) within UL SRS resource set #0. Similarly, when M-DCI based STxMP PUSCH transmission is triggered from a second transmission reception point (TRP #2) 116 (where CORESET associated with triggering DCI having CORESETPoolIndexvalue=1), the UE 102 may assume that the SRI codepoint field value indicates SRI (SRI #1) within UL SRS resource set #1.

Figure 2A:
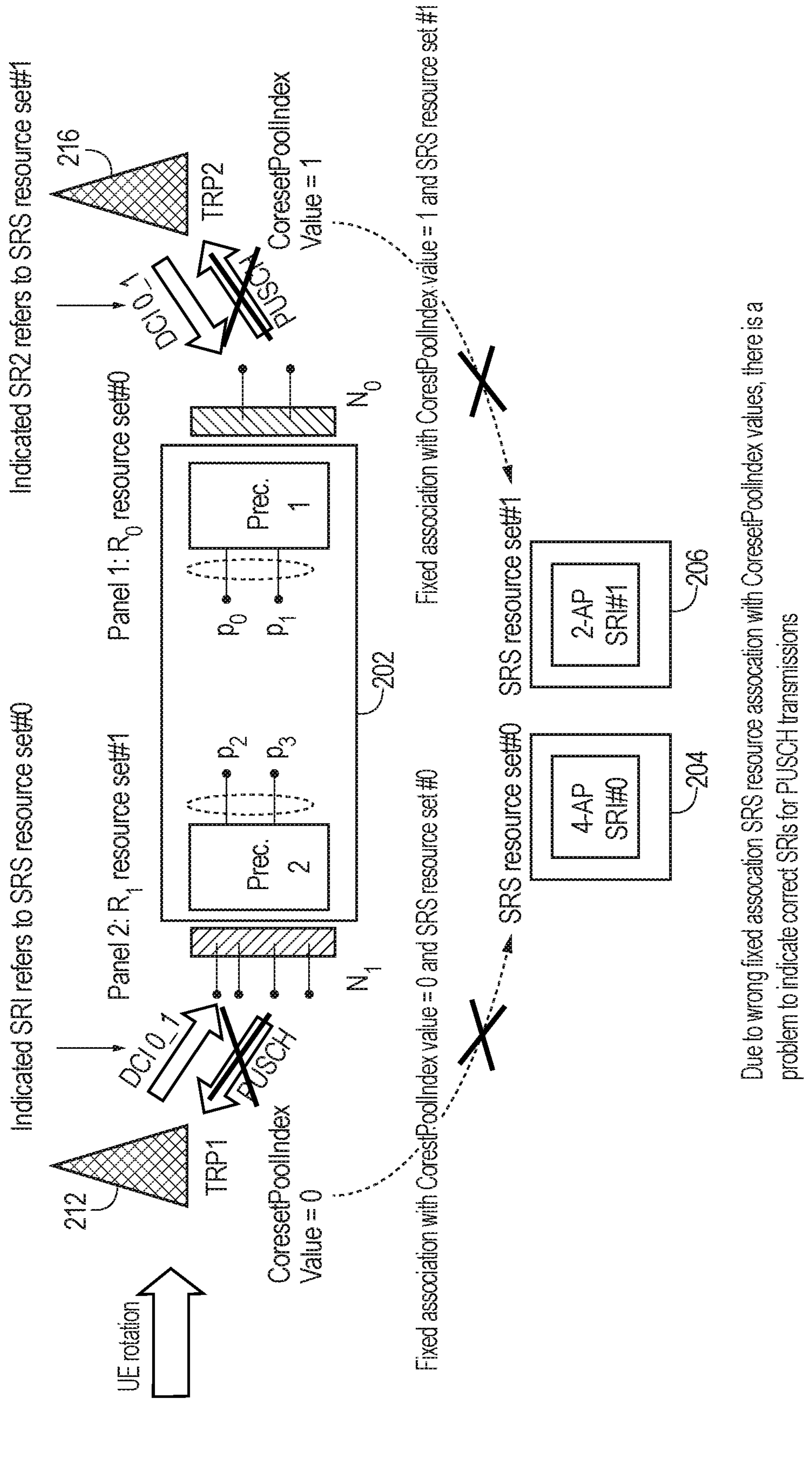
FIG. 2A illustrates an example of use of fixed CORESETPoolIndex value association with UL SRS resource sets.

FIG. 2A illustrates an example of use of fixed CORESETPoolIndexvalue association with UL SRS resource sets. FIG. 2 shows an example of problem related to a fixed association between CORESETPoolIndices and UL SRS resource sets with rotated UE 202 (e.g. with 180 degree). As discussed earlier, based on UE capability index reporting and configured UL SRS sets 1 and 2, both first transmission reception point (TRP1) 212 and second transmission reception point (TRP2) 216 may be aware of UE's 202 UL SRS transmission capability (i.e. number of SRS antenna ports $P_0$, $P_1$, $P_2$, $P_3$, . . . ) to a set of specific DL RS resources. Based on information, both TRPs 212, 216 may identify that configured UL SRS resource sets, i.e. R1 and R0, may have wrong CORESETPoolIndexvalue (CPIv0, CPIv1) associated with both resource sets (i.e. resource set 0 with CORESETPoolIndexvalue=0 and resource set 1 with CORESETPoolIndex value=1). When M-DCI based STxMP PUSCH transmission is triggered from TRP #1 212 (where CORESET associated with triggering DCI having CORESETPoolIndexvalue=0), the UE 202 may assume that the SRI codepoint field value indicates SRI (i.e. SRI #0) within UL SRS resource set #0 (R0). However, due to rotation of the UE 202, UL SRS resource set #0 (R0) may not be associated with CORESETPoolIndexvalue=0 (CPIv0). The reason for this is that antenna panel PN0 associated with SRS resource set #0 (R0) with corresponding TX beams may not be directed towards the first transmission reception point (TRP #1) 212 (i.e. CORESETPoolIndexvalue=0), but rather directed towards the second transmission reception point (TRP #2) 216 (i.e. CORESETPoolIndexvalue=1). Therefore, fixed association leads to triggering of wrong UL SRS resource set (R1) usage for precoder indication for PUSCH. The same problem exists when M-SCI based STxMP PUSCH transmission is triggered from the second transmission reception point (TPR #2) 216. As a result of this, DCI format 0_1 may not be used to trigger M-DCI based STxMP PUSCH transmission to different TRPs (i.e., TRP #2 216) when fixed association between CoresetPoolIndices and SRS resource sets are applied.

As discussed above, current specification or any prior art work does not provide solution to solve the problem related to fixed association between configured UL SRS resource sets and CoresetPoolIndices, leading to a problem that existing uplink DCI format may not be used to trigger M-DCI based STxMP PUSCH transmission to different TRPs.

This disclosure proposes a new implicit/autonomous M-DCI based STxMP PUSCH CORESETPoolIndexvalue switch for configured UL SRS resource sets. In one embodiment, the UE 202 may operate autonomously or in self-adaptation for the number of ports for an SRS resource set, which is associated with a CORESETPoolIndex that may be allowed. In some examples, the adaptation may be needed when the UE 202 rotates/changes its orientation with respect to the resource of the DL-RS configured in the indicated TCI states. In the adaptation, the UE 202 may determine that another antenna panel may be used for higher quality reception/transmission using an indicated TCI state such that the SRS resource set is configured to follow the TCI state.

In one embodiment, when the UE 202 performs autonomous adaptation, the UE 202 may implicitly switch to configured CORESETPoolIndexvalues (CPIv0, CPIv1 . . . ) between the configured UL SRS resource sets (R0, R1 . . . ), from a first association (R1/CPIv0 and R0/CPIv1) to a second association (R0/CPIv0 and R1/CPIv1) or vice versa, or between the at least two CORESETPoolIndexvalues (CPIv0 and CPIv1 . . . ) and the at least two sounding reference signal resource sets (R0, R1, . . . ).

In an alternative embodiment, downlink DCI may include a codepoint field for TCI state indication, which may be defined as implicit indication for a change of CORESETPoolIndexvalues (CPIv0 and CPIv1 . . . ) between the configured UL SRS resource sets (R0, R1 . . . ).

Upon detection of DCI including configured TCI state, the UE 202 may apply a priorization rule where the CORESETPoolIndex of the DCI indicating TCI states may apply for a UL SRS resource set corresponding to the indicated TCI state (e.g., R0/CPIv0, R1/CPIv1 . . . ), where the UL SRS resource set may be configured with FollowUnifiedTCIStateSRS-r17. In other words, as a result of the priorization rule, the UE may overwrite an existing value CORESETPoolIndexvalue with a CORESETPoolIndexvalue (e.g., from CPIv0 to CPIv1, or vice versa, or other combination of values) of the CORESET associated with the triggering DCI.

In one example, the UE 202 may perform autonomous adaptation. In an example, for a number of ports for the SRS resource in a SRS resource set: if the UE 202 determines that it is not capable of transmitting the SRS resource according to the capability (e.g., number of ports supported by the antenna panel that UE now switch to), then it may be allowed to reduce the number of ports supported by the capability. For example, if the SRS resource is a N-port resource, but the selected antenna panel has a capability of M (M<N), the UE 202 may be allowed to transmit the SRS resource with M number of ports.

If the SRS resource set includes SRS resource set with a configured port number N that is not higher than the capability M, the UE 202 may select to use the SRS resource up to M ports.

Figure 2B:
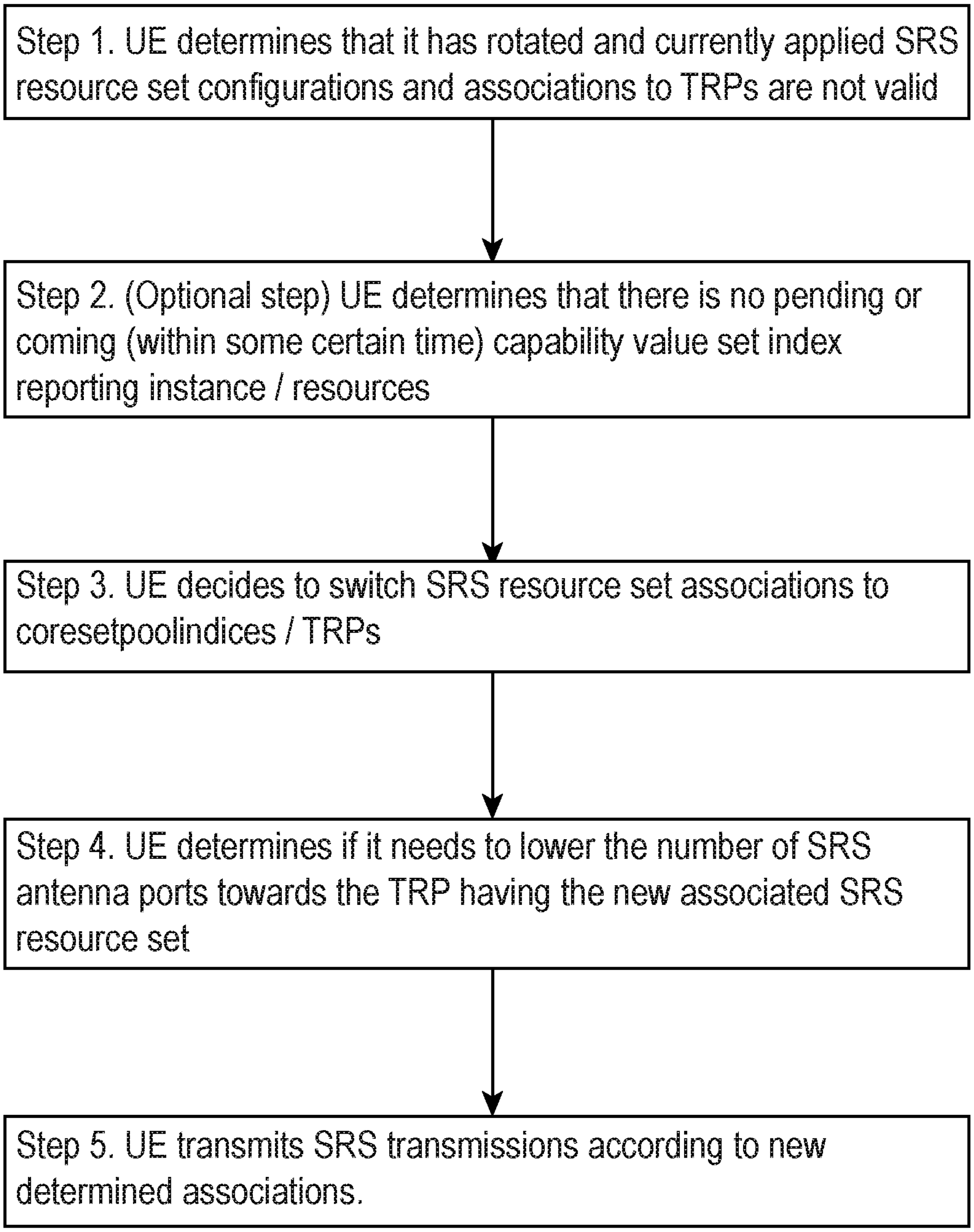
FIG. 2B illustrates exemplary steps of an implementation of SRS resource sets transmissions through autonomous adaptation.

FIG. 2B illustrates exemplary UE steps of an implementation of SRS resource sets transmissions through autonomous adaptation: In step 1, UE 202 may determine that first antenna panel PN0 or second antenna panel PN1 may have rotated and the currently applied SRS resource set (e.g., R0 or R1) configurations and associations to TRPs (212, 216) may not be valid.

In step 2, (Optional step) UE 202 may determine that there is no pending or coming (within some certain time) capability value set index reporting instance/resources.

In step 3, UE 202 may decide to switch SRS resource set associations to coresetpoolindices/TRPs. As described, by switching configured CORESETPoolIndexvalues (CPIv0, CPIv1 . . . ) between the configured UL SRS resource sets (R0, R1 . . . ), from a first association (R1/CPIV0 and R0/CPIv1) to a second association (R0/CPIv0 and R1/CPIv1) or vice versa, such as between the at least two CORESETPoolIndex values (CPIv0 and CPIv1 . . . ) and the at least two sounding reference signal resource sets (R0, R1, . . . ).

In step 4, UE 202 may determine if there may be a need to lower the number of SRS antenna ports towards the TRP having a new associated SRS resource set, for example, from N lowered to M number of ports.

In step 5, UE 202 may transmit SRS transmissions according to the new determined associations (SRS0/R0/CPIV0 and SRS1/R1/CPIv1 . . . ), after the switching.

In one example, the autonomous adaptation may be triggered when the UE 202 determines that the DL-RS corresponding to the indicated TCI state may be received with higher quality using another antenna panel. A higher quality may refer to the another antenna panel measuring the DL-RS with quality that is X dB better than with a current antenna panel. The value X may be configured by a network entity (e.g., TRP1 212 or TP2 216) or may be predefined.

In one example, the autonomous adaptation may be triggered when the UE 202 determines that the antenna panel PN0 or PN1 has rotated. In one example, the autonomous adaptation may be triggered based on the UE implementation reason.

In one example, the autonomous adaptation may be triggered when the UE 202 determines that it has switched the panel PN0 used for an indicated TCI state 0. In one example, if even one of the panels (PN0 or PN1) may fulfill the autonomous adaptation criteria, UE202 is still allowed to perform it.

In one example, the UE 202 may determine that the above operation per antenna panel basis. In one example, the antenna panel (PN0 or PN1) may be referred as capability index value i.e. a DL RS may be associated with a specific capability index that has been reported, and if UE 202 determines that the SRS resource in a set would be transmitted with different capability (e.g. lower) that has been reported, the UE 202 may be allowed to adapt the port number for the SRS transmission. In one example, the UE behavior/whether the port number adaptation is allowed, may be configured by the network entity 212.

Figure 3:
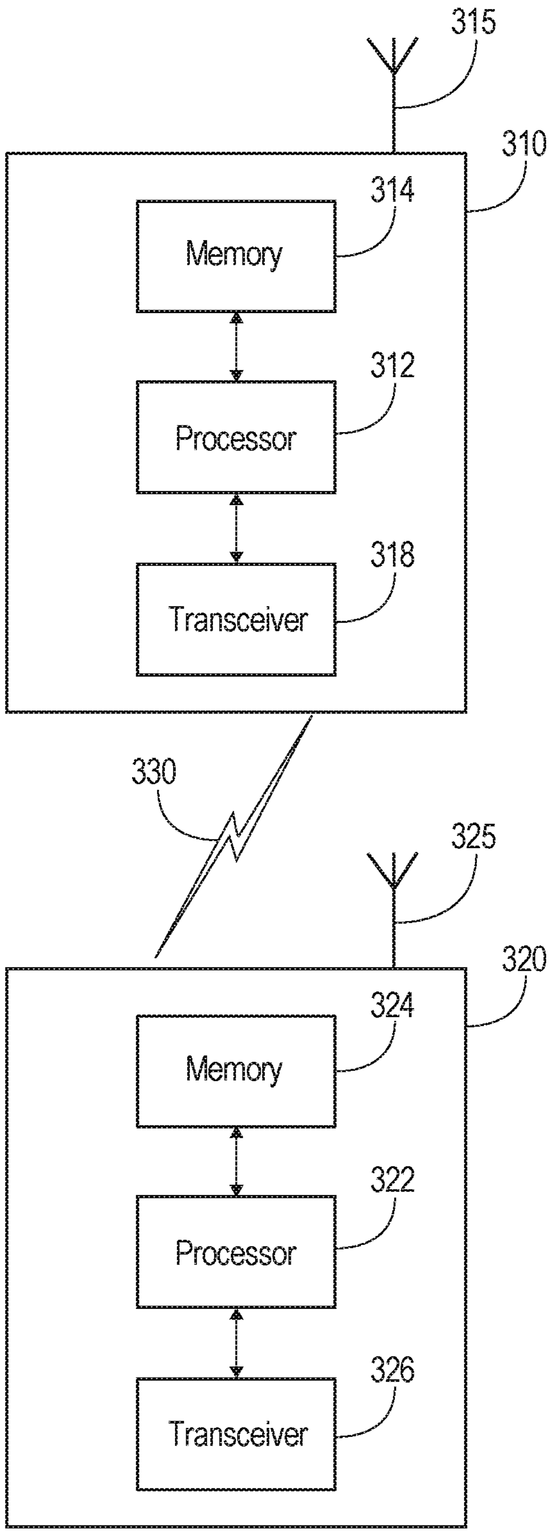
FIG. 3 illustrates a set of apparatuses, according to various exemplary embodiments.

According to a first exemplary embodiment of an apparatus (202, 310) may include at least one processor 312; and at least one memory 314, as shown in FIG. 3, storing instructions that, when executed by the at least one processor 312, cause the apparatus (202, 310) at least to: (i) receive, from a network entity (212, 320), one or both of: at least one resource of at least one downlink reference signal (DL RS), and an indication; (ii) trigger switching, from a first association (R1/CPIv0 and R0/CPIv1) to a second association (R0/CPIv0 and R1/CPIv1) between at least two CORESETPoolIndex values (CPIv0 and CPIv1 . . . ) and at least two sounding reference signal resource sets (R0, R1, . . . ), based on a determination of one or both of: a measured value of the at least one DL reference signal and the indication; and (iii) transmit respectively, to the network entity (212, 320), corresponding resources of one or more sounding reference signals (SRS0, SRS1 . . . ) that correspond to the second association (R0/CPIv0, R1/CPIv1 . . . ) after the switching.

According to a second exemplary embodiment of the apparatus (202, 310) when the switching takes place, the apparatus (202, 310) is further caused to: (a) determine an association of at least a first SRS resource set (R0) to a first number of antenna ports (N), that a measurement value of a first DL RS (RS1) of an associated first indicated TCI state (e.g., state 1) is lower than a second DL RS (RS2) of a second indicated TCI state (e.g., state 0); (b) associate the second indicated TCI state (state 0) to the first SRS resource set (R0); and (c) determine that the first number of antenna ports (N) is larger than a second number of antenna ports (M) associated to a second SRS resource set (R0).

According to a third exemplary embodiment of the apparatus (202, 310), the apparatus (202, 310) is further caused to: determine a panel transmission capability change in terms of a number of antenna ports to be equal as the second number of antenna ports (M) for SRS resources (SRS0) of the first SRS resource set (R0); and apply the second number of antenna ports (M) for the transmission of the SRS resources (SRS0) of the first SRS resource set (R0).

According to a fourth exemplary embodiment of the apparatus (202, 310), a layer 1 reference signal received power (L1-RSRP) measurement value of a first DL RS (RS1) is smaller than the L1-RSRP measurement value of a second DL RS (RS2).

According to a fifth exemplary embodiment of the apparatus (202, 310), the indication triggers a multi-downlink control information (M-DCI) based simultaneous multi-panel uplink transmission (STxMP) of physical uplink shared channel (PUSCH) CORESETPoolIndex value switch for the transmission of SRS resource sets (R0, R1 . . . ).

According to a sixth exemplary embodiment of the apparatus (202, 310), the PUSCH is associated with a SRS resource set (SRSx) to correspond to a same CORESETPoolIndex value (CPIvx).

According to a seventh exemplary embodiment of the apparatus (202, 310), the CORESETPoolIndex value is associated with a respective network entity.

According to an eighth exemplary embodiment of the apparatus (202, 310), each SRS resource set (R0, R1 . . . ) is configured with different number of SRS resources with different number of antenna ports according to antenna panel transmission capabilities.

According to a nineth exemplary embodiment of the apparatus (202, 310), the first number of antenna port (N) on a first antenna panel (PN0) may include at least four antenna ports on a first antenna panel and the second number of antenna port (M) may include at least at least two antenna ports on a second antenna panel (PN1) for transmission and reception.

According to a tenth exemplary embodiment of the apparatus (202, 310), the apparatus is configured to autonomously or self-adapt for different number of antenna ports (e.g., $P_x$) for a respective SRS resource set (e.g., SRSx) associated with a respective CORESETPoolIndex value (e.g., CPIvx).

According to an eleventh exemplary embodiment of the apparatus (202, 310), the apparatus is configured to perform self-adaptation when the apparatus is being rotated or changed its orientation with respect to the resource of DL-RS configured in the indicated TCI states.

According to a twelve exemplary embodiment of the apparatus (202, 310), the apparatus is configured to determine that one of the first (PN0) or the second antenna panel (PN1) is being used for higher quality reception/transmission using the first or the second indicated TCI state to configure a respective SRS resource set to follow a corresponding TCI state.

According to a thirteenth exemplary embodiment of the apparatus (202, 310), the apparatus is configured to perform autonomous adaptation, by implicitly switching configured CORESETPoolIndex values between configured UL SRS resource sets.

According to a fourteenth exemplary embodiment of the apparatus (202, 310), the apparatus is configured to downlink DCI including codepoint field for TCI state indication is defined as implicit indication for a change of CORESETPoolIndex values between configured UL SRS resource sets.

According to a fifteenth exemplary embodiment of the apparatus (202, 310), the apparatus is configured to upon detection of DCI including of configured TCI state, apply prioritization rules, where CORESETPoolIndex value of the DCI indicates TCI states is applied for UL SRS resource set corresponding the indicated TCI state, where UL SRS resource set is configured with FollowUnifiedTCIStateSRS-r17.

According to a sixteenth exemplary embodiment of the apparatus (202, 310), the apparatus is configured to overwrite existing value CORESETPoolIndex value with CORESETPoolIndex value of CORESET of triggering DCI.

According to a seventeenth exemplary embodiment of the apparatus (202, 310), the apparatus is configured to perform autonomous adaptation for: a number of ports ($P_x$) for the SRS resource in an SRS resource set: if the apparatus determines that it is not capable of transmitting SRS resource according to the number of ports supported by the first antenna panel (PN0) that the apparatus is configured to switch to.

According to a eighteenth exemplary embodiment of the apparatus (202, 310), the apparatus is configured to reduce a number of ports supported by the capability, if the SRS resource is N-port resource having a selected antenna panel with a capability of M ports, where M<N is allowed to transmit the SRS resource set includes SRS resource set with configured port number N that is not higher than the capability M, the apparatus is selected to use the SRS resource up to M ports.

According to a nineteenth exemplary embodiment is an apparatus (202, 310), including: means for receiving, from a network device, one or both of: at least one resource of at least one downlink reference signal, and an indication; means for triggering switching, from a first association to a second association between at least two CORESETPoolIndex values and at least two sounding reference signal resource sets, based on a determination of one or both of: a measured value of the at least one DL reference signal and the indication; and means for transmitting respectively, to the network device, corresponding resources of one or more sounding reference signals that correspond to the second association after the switching.

According to a twentieth exemplary embodiment is a method performed by an apparatus (202, 310), including the steps of: receiving, from a network device, one or both of: at least one resource of at least one downlink reference signal, and an indication; triggering switching, from a first association to a second association between at least two CORESETPoolIndex values and at least two sounding reference signal resource sets, based on a determination of one or both of: a measured value of the at least one DL reference signal and the indication; and transmitting respectively, to the network device, corresponding resources of one or more sounding reference signals that correspond to the second association after the switching.

According to a twenty first exemplary embodiment, a non-transitory computer readable storage medium 314 storing instruction that, when executed by at least one processor 312 of an apparatus (202, 310), causes the apparatus at least to perform: receiving, from a network device, one or both of: at least one resource of at least one downlink reference signal, and an indication; triggering switching, from a first association to a second association between at least two CORESETPoolIndex values and at least two sounding reference signal resource sets, based on a determination of one or both of: a measured value of the at least one DL reference signal and the indication; and transmitting respectively, to the network device, corresponding resources of one or more sounding reference signals that correspond to the second association after the switching.

According to a twenty second exemplary embodiment, a network entity (212, 216, 320), may include: at least one processor 322; and at least one memory 324 storing instructions that, when executed by the at least one processor 322, cause the network entity (212, 216, 320) at least to: (i) provide, to a user equipment (202, 310), one or both of: at least one resource of at least one downlink reference signal (DL RS), and an indication; and (ii) receive respectively, corresponding resources of one or more sounding reference signals (SRS0, SRS1 . . . ) transmitted from the user equipment, each of the one or more respective SRS resource sets corresponds to the at least one corresponding respective resource set association (SRS0/R0/CPIv0, SRS1/R1/CPIv1 . . . ) after switching from a first association (R1/CPIV0 and R0/CPIv1) to a second association (R0/CPIv0 and R1/CPIv1) between at least two CORESETPoolIndex values (CPIv0 and CPIv1 . . . ) and at least two sounding reference signal resource sets (R0, R1, . . . ), based on a determination of one or both of: a measured value of the at least one DL reference signal and the indication.

According to a twenty third exemplary embodiment, a network entity (212, 216, 320) may include: means for providing to a user equipment (202, 310), one or both of: at least one resource of at least one downlink reference signal, and an indication; and means for receiving respectively, corresponding resources of one or more sounding reference signals transmitted from the user equipment, each of the one or more respective SRS resource sets corresponds to the at least one corresponding respective resource set association after switching from a first association to a second association between at least two CORESETPoolIndex values and at least two sounding reference signal resource sets, based on a determination of one or both of: a measured value of the at least one DL reference signal and the indication.

According to a twenty fourth exemplary embodiment, a network entity (212, 216, 320), a method performed by a network entity (212, 216, 320), may include the steps of: providing to a user equipment (202, 310), one or both of: at least one resource of at least one downlink reference signal, and an indication; and receiving respectively, corresponding resources of one or more sounding reference signals transmitted from the user equipment, each of the one or more respective SRS resource sets corresponds to the at least one corresponding respective resource set association after switching from a first association to a second association between at least two CORESETPoolIndex values and at least two sounding reference signal resource sets, based on a determination of one or both of: a measured value of the at least one DL reference signal and the indication.

According to a twenty fifth exemplary embodiment, a non-transitory computer readable storage medium 324 storing instruction that, when executed by at least one processor 322 of a network entity (212, 216, 320), causes the network entity at least to perform: providing to a user equipment, one or both of: at least one resource of at least one downlink reference signal, and an indication; and receiving respectively, corresponding resources of one or more sounding reference signals transmitted from the user equipment, each of the one or more respective SRS resource sets corresponds to the at least one corresponding respective resource set association after switching from a first association to a second association between at least two CORESETPoolIndex values and at least two sounding reference signal resource sets, based on a determination of one or both of: a measured value of the at least one DL reference signal and the indication.

According to a twenty sixth exemplary embodiment, is a method is provided for a user equipment (202, 310) or a network entity (212, 216, 320), substantially as shown and described with respect to at least one of FIGS. 1-3, for determining switching of CORESETPoolIndex values for M-DCI based Simultaneous Multi-Panel PUSCH Transmission.

According to a twenty seventh exemplary embodiment is a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps comprising those substantially as shown and described with respect to at least one of FIGS. 1-3, for determining switching of CORESETPoolIndex values for M-DCI based Simultaneous Multi-Panel PUSCH Transmission.

According to a twenty eighth exemplary embodiment, a system is provided, substantially as shown and described with respect to at least one of FIGS. 1-3, for determining switching of CORESETPoolIndex values for M-DCI based Simultaneous Multi-Panel PUSCH Transmission.

FIG. 3 illustrates a set of apparatuses, according to various exemplary embodiments.

In some example embodiments, apparatuses 310 and/or 320 may include one or more processors, one or more computer-readable storage medium (for example, memory, storage, or the like), one or more radio access components (for example, a modem, a transceiver, or the like), and/or a user interface. In some example embodiments, apparatuses 310 and/or 320 may be configured to operate using one or more radio access technologies, such as GSM, LTE, LTE-A, NR, 5G, WLAN, WiFi, NB-IoT, Bluetooth, NFC, MulteFire, and/or any other radio access technologies.

As illustrated in the example of FIG. 3, apparatuses 310 and/or 320 may include or be coupled to processors 312 and 322, respectively, for processing information and executing instructions or operations. Processors 312 and 322 may be any type of general or specific purpose processor. In fact, processors 312 and 322 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 312 (and 322) for each of apparatuses 310 and/or 320 is shown in FIG. 3, multiple processors may be utilized according to other example embodiments. For example, it should be understood that, in certain example embodiments, apparatuses 310 and/or 320 may include two or more processors that may form a multiprocessor system (for example, in this case processors 312 and 322 may represent a multiprocessor) that may support multiprocessing. According to certain example embodiments, the multiprocessor system may be tightly coupled or loosely coupled to, for example, form a computer cluster).

Processors 312 and 322 may perform functions associated with the operation of apparatuses 310 and/or 320, respectively, including, as some examples, precoding of antenna gain/phase parameters, encoding and decoding of individual bits forming a communication message, formatting of information, and overall control of the apparatuses 310 and/or 320, including processes illustrated in FIGS. 1-2.

Apparatuses 310 and/or 320 may further include or be coupled to memory 314 and/or 324 (internal or external), respectively, which may be coupled to processors 312 and 322, respectively, for storing information and instructions that may be executed by processors 312 and 322. Memory 314 (and memory 324) may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 314 (and memory 324) may be included of any combination of random access memory (RAM), read only memory (ROM), static storage such as a magnetic or optical disk, hard disk drive (HDD), or any other type of non-transitory machine or computer readable media. The instructions stored in memory 314 and memory 324 may include program instructions or computer program code that, when executed by processors 312 and 322, enable the apparatuses 310 and/or 320 to perform tasks as described herein.

In certain example embodiments, apparatuses 310 and/or 320 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processors 312 and 322 and/or apparatuses 310 and/or 320 to perform any of the methods illustrated in FIGS. 1-2.

In some exemplary embodiments, apparatus 310 may also include or be coupled to one or more antennas 315 for receiving a downlink signal and for transmitting via an uplink from apparatus 310. Apparatuses 310 and/or 320 may further include transceivers 316 and 326, respectively, configured to transmit and receive information. The transceiver 316 and 326 may also include a radio interface that may correspond to a plurality of radio access technologies including one or more of GSM, LTE, LTE-A, 5G, NR, WLAN, NB-IoT, Bluetooth, BT-LE, NFC, RFID, UWB, or the like. The radio interface may include other components, such as filters, converters (for example, digital-to-analog converters or the like), symbol demappers, signal shaping components, an Inverse Fast Fourier Transform (IFFT) module, or the like, to process symbols, such as OFDMA symbols, carried by a downlink or an uplink.

For instance, transceivers 316 and 326 may be respectively configured to modulate information on to a carrier waveform for transmission, and demodulate received information for further processing by other elements of apparatuses 310 and/or 320. In other example embodiments, transceivers 316 and 326 may be capable of transmitting and receiving signals or data directly. Additionally or alternatively, in some example embodiments, apparatuses 310 and/or 320 may include an input and/or output device (I/O device). In certain example embodiments, apparatuses 310 and/or 320 may further include a user interface, such as a graphical user interface or touchscreen.

In certain example embodiments, memory 314 and memory 324 store software modules that provide functionality when executed by processors 312 and 322, respectively. The modules may include, for example, an operating system that provides operating system functionality for apparatuses 310 and/or 320. The memory may also store one or more functional modules, such as an application or program, to provide additional functionality for apparatuses 310 and/or 320. The components of apparatuses 310 and/or 320 may be implemented in hardware, or as any suitable combination of hardware and software. According to certain example embodiments, apparatus 310 may optionally be configured to communicate with apparatus 320 via a wireless or wired communications link 330 according to any radio access technology, such as NR.

According to certain example embodiments, processors 312 and 322, and memory 314 and 324 may be included in or may form a part of processing circuitry or control circuitry. In addition, in some example embodiments, transceivers 313 and 326 may be included in or may form a part of transceiving circuitry.

As used herein, the term "circuitry" may refer to hardware-only circuitry implementations (for example, analog and/or digital circuitry), combinations of hardware circuits and software, combinations of analog and/or digital hardware circuits with software/firmware, any portions of hardware processor(s) with software, including digital signal processors, that work together to cause an apparatus (for example, apparatus 310 and/or 320) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor or multiple processors, or portion of a hardware circuit or processor, and the accompanying software and/or firmware. The term circuitry may also cover, for example, a baseband integrated circuit in a server, cellular network node or device, or other computing or network entity.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (for example, apparatuses 310 and/or 320), for example through the use of an application specific integrated circuit (ASIC), a programmable gate array (PGA), a field programmable gate array (FPGAS), or any other combination of hardware and software. In yet another example embodiment, the functionality may be implemented as a signal, a non-tangible means that may be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell", "node", "gNB", or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

AP antenna port
AS antenna switching
DCI downlink control information
DL downlink
NZP-CSI-RS non-zero-power channel state information reference signal
PDSCH physical downlink shared channel
PRB physical resource block
PUCCH physical uplink control channel
PUSCH physical uplink shared data channel
QCL quasi-co-location
RSRP reference signal received power
SRS uplink sounding reference signal
SRI sounding reference signal resource indicator
UL uplink
DG-PUSCH Dynamic Grant PUSCH
GC-PUSCH Configured Grant PUSCH

We claim:

1. An apparatus, comprising:

at least one processor; and at least one memory storing instructions that, when executed by the at least one processor, cause the apparatus at least to:

(i) receive, from a network entity, one or both of: at least one resource of at least one downlink reference signal, and an indication;

(ii) trigger switching, from a first association to a second association between at least two CORESETPoolIndex values and at least two sounding reference signal resource sets, based on a determination of one or both of: a measured value of the at least one downlink reference signal (DL RS) and the indication; and (iii) transmit respectively, to the network entity, corresponding resources of one or more sounding reference signals (SRS) that correspond to the second association after the switching, wherein when the switching takes place, the apparatus is further caused to:

(a) determine an association of at least a first SRS resource set to a first number of antenna ports, that a measurement value of a first DL RS of an associated first indicated TCI state is lower than a second DL RS of a second indicated TCI state;

(b) associate the second indicated TCI state to the first SRS resource set; and (c) determine that the first number of antenna ports is larger than a second number of antenna ports associated to a second SRS resource set, wherein the apparatus is configured to autonomously or self-adapt for different number of antenna ports for a respective SRS resource set associated with a respective CORESETPoolIndex value, wherein the apparatus is configured to upon detection of DCI comprising of configured TCI state, apply prioritization rules, where CORESETPoolIndex value of the DCI indicates TCI states is applied for UL SRS resource set corresponding the indicated TCI state, where UL SRS resource set is configured with FollowUnifiedTCIStateSRS-r17, wherein the apparatus is configured to overwrite existing value CORESETPoolIndex value with CORESETPoolIndex value of CORESET of triggering DCI.

2. The apparatus according to claim 1, wherein the apparatus is further caused to:

determine a panel transmission capability change in terms of a number of antenna ports to be equal as the second number of antenna ports for SRS resources of the first SRS resource set; and apply the second number of antenna ports for the transmission of the SRS resources of the first SRS resource set.

3. The apparatus according to claim 1, wherein a L1-RSRP measurement value of a first DL RS is smaller than a layer 1 reference signal received power (L1-RSRP) measurement value of a second DL RS.

4. The apparatus according to claim 1, wherein the indication triggers a multi-downlink control information (M-DCI) based simultaneous multi-panel uplink transmission (STxMP) of physical uplink shared channel (PUSCH) CORESETPoolIndex value switch for the transmission of SRS resource sets.

5. The apparatus according to claim 4, wherein the PUSCH is associated with an SRS resource set to correspond to a same CORESETPoolIndex value.

6. The apparatus according to claim 5, wherein the CORESETPoolIndex value is associated with a respective network entity.

7. The apparatus according to claim 1, wherein each SRS resource set is configured with different number of SRS resources with different number of antenna ports according to antenna panel transmission capabilities.

8. The apparatus according to claim 7, wherein the second number of antenna port includes at least four antenna ports on a first antenna panel and the first number of antenna port includes at least at least two antenna ports on a second antenna panel for transmission and reception.

9. The apparatus according to claim 1, wherein the apparatus is configured to perform self-adaptation when the apparatus is being rotated or changed its orientation with respect to the resource of DL-RS configured in the indicated TCI states.

10. The apparatus according to claim 1, wherein the apparatus is configured to determine that one of the first or the second antenna panel is being used for higher quality reception/transmission using the first or the second indicated TCI state to configure a respective SRS resource set to follow a corresponding TCI state.

11. The apparatus according to claim 1, wherein the apparatus is configured to perform autonomous adaptation, by implicitly switching configured CORESETPoolIndex values between configured UL SRS resource sets.

12. The apparatus according to claim 1, wherein the apparatus is configured to downlink DCI including codepoint field for TCI state indication is defined as implicit indication for a change of CORESETPoolIndex values between configured UL SRS resource sets.

13. The apparatus according to claim 1, wherein the apparatus is configured to perform autonomous adaptation for: number of ports for the SRS resource in an SRS resource set: if the apparatus determines that it is not capable of transmitting SRS resource according to a number of ports supported by the antenna panel that the apparatus is configured to switch to.

14. The apparatus according to claim 13, wherein the apparatus is configured to reduce a number of ports supported by the capability, if the SRS resource is N-port resource having a selected antenna panel with a capability of M ports, where M<N is allowed to transmit the SRS resource set includes SRS resource set with configured port number N that is not higher than the capability M, the apparatus is selected to use the SRS resource up to M ports.

* * * * *